US010425856B2

(12) United States Patent
Dribinski et al.

(10) Patent No.: US 10,425,856 B2
(45) Date of Patent: *Sep. 24, 2019

(54) METHOD OF CONTROLLING TRAFFIC IN A CELLULAR NETWORK AND SYSTEM THEREOF

(71) Applicant: CELLWIZE WIRELESS TECHNOLOGIES LTD., Tel Aviv (IL)

(72) Inventors: Daniel Dribinski, Rishon-Lezion (IL); Evgeny Finkel, Petah-Tikva (IL); Sasi Geva, Ein Vered (IL)

(73) Assignee: CELLWIZE WIRELESS TECHNOLOGIES LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/892,538

(22) Filed: Feb. 9, 2018

(65) Prior Publication Data
US 2018/0167843 A1  Jun. 14, 2018

Related U.S. Application Data

(63) Continuation of application No. 14/955,389, filed on Dec. 1, 2015, now Pat. No. 9,930,566.
(Continued)

(51) Int. Cl.
*H04W 28/02* (2009.01)
*H04W 16/08* (2009.01)
(Continued)

(52) U.S. Cl.
CPC ..... *H04W 28/0284* (2013.01); *H04L 41/0823* (2013.01); *H04L 43/08* (2013.01);
(Continued)

(58) Field of Classification Search
CPC .... H04L 41/00; H04L 43/08; H04W 28/0284; H04W 16/08; H04W 24/00; H04W 28/08; H04W 48/06
See application file for complete search history.

(56) References Cited

U.S. PATENT DOCUMENTS 5,796,722 A    8/1998 Kotzin et al.
6,895,245 B2   5/2005 Wallentin
(Continued)

FOREIGN PATENT DOCUMENTS

GB       2489553        10/2012
WO   WO 2010133256       5/2009
(Continued)

OTHER PUBLICATIONS

Szilagyi, P., Vincze, Z., and Vulkan, C., Integrated Mobility Load Balancing and Traffic Steering Mechanism in LTE, Symposium, 2013 IEEE 24th International Symposium on Personal Indoor and Mobile Radio Communications (PIMRC), Sep. 2013, pp. 2148-2153, IEEE.

*Primary Examiner* — Benjamin H Elliott, IV
(74) *Attorney, Agent, or Firm* — Wiggin and Dana LLP; Gregory S. Rosenblatt; Jonathan D. Hall (57) ABSTRACT

There are provided a system and a method of controlling traffic in a cellular network comprising a plurality of controlled access points (APs) configured to serve passengers in one or more trains moving in accordance with a train schedule. The method comprises: prior to a scheduled event associated with an expected substantive increase of passengers to be served by an AP, obtaining expected classification results indicative of an expected, during the scheduled event, load of the AP with respect to a downlink and/or uplink load thresholds; and at a scheduled time enabling providing pre-configured provisioning actions in accordance with the expected classification results. The method can further com-
(Continued)

prise collecting data informative of moving, responsive to moving the one or more trains in accordance with the train schedule, load between APs; and processing the collected data to obtain data informative of the expected load of the AP during the scheduled event.

16 Claims, 8 Drawing Sheets

Related U.S. Application Data (60) Provisional application No. 62/085,953, filed on Dec. 1, 2014.

(51) Int. Cl.

| | | |
|---|---|---|
| *H04L 12/26* | (2006.01) | |
| *H04W 28/08* | (2009.01) | |
| *H04L 12/24* | (2006.01) | |
| *H04W 24/02* | (2009.01) | |
| *H04W 36/08* | (2009.01) | |
| *H04W 48/20* | (2009.01) | |
| *H04W 36/00* | (2009.01) | |

(52) U.S. Cl.
CPC ............ *H04L 43/16* (2013.01); *H04W 16/08* (2013.01); *H04W 24/02* (2013.01); *H04W 28/08* (2013.01); *H04W 36/00837* (2018.08); *H04W 36/08* (2013.01); *H04W 48/20* (2013.01)

(56) References Cited

U.S. PATENT DOCUMENTS

| | | |
|---|---|---|
| 8,462,807 B2 | 6/2013 | Turk et al. |
| 8,463,272 B2 | 6/2013 | Yamamoto et al. |
| 8,467,351 B2 | 6/2013 | Liu et al. |
| 8,774,823 B2 | 7/2014 | Golaup et al. |
| 8,787,911 B2 | 7/2014 | Johnstone et al. |
| 9,930,566 B2 * | 3/2018 | Dribinski ............... H04L 43/08 |
| 2003/0040311 A1 * | 2/2003 | Choi ...................... H04W 48/20 455/434 |
| 2003/0210671 A1 * | 11/2003 | Eglin ................... H04L 12/4641 370/338 |
| 2006/0128394 A1 | 6/2006 | Turina et al. |
| 2006/0166677 A1 | 7/2006 | Derakshan et al. |
| 2009/0323530 A1 | 12/2009 | Trigui et al. |
| 2010/0022250 A1 | 1/2010 | Petrovic et al. |
| 2011/0039564 A1 | 2/2011 | Johnstone et al. |
| 2011/0065438 A1 | 3/2011 | Bergman et al. |
| 2011/0176424 A1 | 7/2011 | Yang et al. |
| 2011/0222416 A1 | 9/2011 | Damnjanovic et al. |
| 2012/0082051 A1 * | 4/2012 | Kim ...................... H04W 24/10 370/252 |
| 2012/0270553 A1 | 10/2012 | Ha |
| 2013/0077491 A1 | 3/2013 | Cherian et al. |
| 2013/0295946 A1 | 11/2013 | Panchal et al. |
| 2014/0146681 A1 * | 5/2014 | Gusavec ........... H04W 28/0284 370/237 |
| 2014/0269364 A1 | 9/2014 | Knapp et al. |
| 2015/0156690 A1 * | 6/2015 | Futaki .................. H04W 36/08 455/436 |
| 2015/0163723 A1 * | 6/2015 | Pandey ................. H04W 16/10 370/252 |
| 2016/0119813 A1 | 4/2016 | Sridhar et al. |
| 2016/0157240 A1 | 6/2016 | Dribinski et al. |
| 2018/0167843 A1 * | 6/2018 | Dribinski ............... H04L 43/08 |

FOREIGN PATENT DOCUMENTS

| | | |
|---|---|---|
| WO | WO 2010034665 | 9/2009 |
| WO | WO 2011020483 | 2/2011 |
| WO | WO 2013156067 | 4/2012 |
| WO | WO 2013167187 | 5/2012 |
| WO | WO 2014016280 | 7/2013 |
| WO | WO 2014064674 | 10/2013 |

* cited by examiner

METHOD OF CONTROLLING TRAFFIC IN A CELLULAR NETWORK AND SYSTEM THEREOF

CROSS REFERENCE TO RELATED APPLICATION

The present application is a continuation of U.S. patent application Ser. No. 14/955,389 entitled "Method Of Controlling Traffic In A Cellular Network and System Thereof" and filed Dec. 1, 2015, which claims priority to U.S. Provisional Patent App. No. 62/085,953 filed Dec. 1, 2014. The contents of U.S. patent application Ser. No. 14/955,389 and U.S. Provisional Patent App. No. 62/085,953 are hereby incorporated herein in their entirety.

TECHNICAL FIELD

The presently disclosed subject matter relates generally to systems and methods of wireless communication and, particularly, to methods of controlling traffic in cellular networks and systems thereof.

BACKGROUND OF THE INVENTION

For today's complex cellular networks, traffic control has become essential for efficient utilization of the overall available resources.

Nowadays, the world of cellular communication is characterized by simultaneous deployment of multiple Radio Access Technologies (RATs) and multiple bands of the same RATs in a given coverage area of a given operator. Multi-RAT and multi-band cellular communication environment can result from implementing emerging new cellular communication standards whilst retaining legacy technologies for as long as possible. Such environment can be also caused by fragmented spectrum received for a given RAT by a given operator due to licensing issues and for other reasons.

Mobile operators face a growing need to define how and when their network resources are used, and to balance the load of respective network resources. Efficient utilization of the available pool of resources requires traffic control aiming at distributing the load in an optimal manner. Distributing the load may be performed between different cells by handing over transmission of data to other cells at a same frequency and/or across different RATs and bands.

Problems of controlling traffic in cellular networks have been recognized in the conventional art and various techniques have been developed to provide solutions. For example:

US Patent Application No. 2009/0323530 discloses a method, program, system and apparatus performing dynamic load balancing of coverage areas in a wireless communication network. Dynamic load balancing is performed by evaluating cell congestion based on location information of subscribers in the wireless communication network, collecting network parameters related to the wireless communication network and altering network parameters based on the evaluated cell congestion. After the network parameter is altered, the coverage areas are narrowed. Improvements in cell congestion and quality of server are then determined based on the narrowing of the coverage areas. Altering the plurality of network parameters and evaluating cell congestion are performed continuously until a target quality of service is achieved.

US Patent Application No. 2011/0039564 discloses a method of operation of a cellular access point amongst a plurality of interconnected cellular access points, the method comprising: receiving from a first user equipment a connection attempt that would cause the access point to exceed a first predetermined capacity threshold; selecting one of the previously connected user equipments and an associated one of the plurality of interconnected cellular access points; initiating a handover of the selected one of the previously connected user equipments to the associated one of the plurality of interconnected cellular access points; and establishing a connection with the first user equipment.

US Patent Application No. 2011/0222416 discloses systems and methods for facilitating inter-cell interference coordination using load indication. A UE may receive load indicator signals from a plurality of base stations in adjacent cells and determine, based at least in part on the load indicator signals, a transmit power metric. The transmit power metric may be provided to a serving base station, which may allocate uplink resources based on the transmit power metric. Additional information related to receiver sensitivity and/or path loss may be used to determine the transmit power metric.

US Patent Application No. 2013/0077491 discloses a method of controlling network traffic via a traffic detection function at the user equipment. The method includes obtaining, at an electronic device, an application configuration, the application configuration including an application identifier identifying an application of a plurality of applications and a network communication characteristic corresponding to each of the plurality of applications. The method further includes detecting, at the electronic device, the application identifier in a packet of network traffic. The method also includes transmitting, from the electronic device, the packet of network traffic based on the network communication characteristic corresponding to the detected application identifier. By providing an application identifier, fine grained (e.g., application specific) network controls may be implemented such as quality of service, charging/accounting, idle handoff, and traffic redirection/load balancing.

International Patent Application No. WO10/133256 discloses a technique when a load of an apparatus of a communications network is evaluated and handover parameters to be advertised for mobile station decided handover are adapted accordingly. Radio resource management information may be exchanged between the apparatus and at least one neighboring apparatus in the communications network, and a load of the at least one neighboring apparatus may be evaluated from the exchanged radio resource management information. The handover parameters to be advertised may be adapted in case the evaluated load of the apparatus and the evaluated load of the at least one neighboring apparatus have reached predetermined limits. Mobile stations of a communications network system are provided with modified handover parameters which induce the mobile stations to make a handover decision as desired by a network infrastructure.

International Patent Application No. WO13/156067 discloses a method for configuring a handover procedure of user equipment from a source cell to a target cell within a cellular network system. The cellular network system comprises the source cell and at least one neighboring target cell. The handover procedure is based on measurements being performed by the user equipment prior to a handover, wherein the measurements are based on a cell individual offset. A cell individual offset is assigned to each of the at least one neighboring target cell in relation to the source cell, wherein the cell individual offset is adaptable by a mobility robustness optimization algorithm and a mobility load balancing algorithm. The method comprises computing a first value for the cell individual offset for each of the at least one neighboring target cell representing an optimum cell individual offset for the mobility robustness optimization algorithm, computing a second value lower than or equal to the first value and a third value higher than or equal to the first value for the cell individual offset for each of the at least one neighboring target cell, the second value representing the lowest value being acceptable for the mobility robustness optimization algorithm and the third value representing the highest value being acceptable for the mobility robustness optimization algorithm, setting the cell individual offset to the first value by the mobility robustness optimization algorithm, adapting the cell individual offset between the second value and the third value by the mobility load balancing algorithm, and configuring a handover procedure for the user equipment from the source cell to a target cell based on user equipment measurements being based on the adapted cell individual offset.

International Patent Application No. WO13/167187 discloses a method for resetting mobility parameters being associated with a handover procedure for a user equipment between a source cell and a target cell within a cellular network system. The cellular network system comprises the source cell and at least one neighboring target cell, wherein the handover procedure is initiated by a trigger value, wherein a trigger value is assigned to each of the at least one neighboring target cell in relation to the source cell, wherein the trigger value is dependent on mobility parameters being adaptable by a mobility robustness optimization algorithm and is dependent on mobility parameters being adaptable by a mobility load balancing algorithm. The method comprises resetting the mobility parameters for the mobility robustness optimization algorithm or the mobility load balancing algorithm, generating a message comprising information about the reset of the mobility parameters being associated with the mobility robustness optimization algorithm or the mobility load balancing algorithm and comprising information about the associated algorithm, and transmitting the message between the source cell and the at least one neighboring cell for resetting the mobility parameters of the associated algorithm based on the received message.

International Patent Application No. WO14/016280 discloses a method for implementing a cell load balancing mechanism in wireless networks. The method comprises at least one wireless user terminal (UE) connected through a wireless network to a serving base station and a plurality of network cells, each one comprising at least a base station and/or radio network controllers, each network cell broadcasting a cell load indicator. The at least one wireless user terminal performs following actions: collecting said broadcasted cell load indicator of each one of said plurality of network cells, providing to the wireless network, information about the actual cell load indicators of the plurality of cells, and performing a network cell selection based on the broadcasted cell load indicators, wherein the cell selection is performed without any exchange of cell load indicators between the plurality of network cells.

GENERAL DESCRIPTION

In accordance with certain aspects of the presently disclosed subject matter, there is provided a method of controlling traffic in a cellular network comprising a plurality of controlled access points (APs). The method comprises: continuously obtaining by a computerized system data informative of resource utilization with regard to APs of the plurality of controlled APs; processing, by the computerized system, the obtained data to continuously classify, for a given AP of the plurality of controlled APs, downlink load with respect to a downlink load threshold and uplink load with respect to an uplink load threshold, thereby giving rise to downlink and uplink classification results, wherein uplink load classification is provided independently of downlink load classification; and enabling, by the computerized system, provisioning of the given AP in accordance with respective classification results, wherein: provisioning in accordance with downlink classification results comprises changing cell reselection parameters and/or changing cell footprint parameters; provisioning in accordance with uplink classification comprises changing cell selection parameters; and provisioning in accordance with uplink classification is enabled independently of provisioning in accordance with downlink classification.

The method can further comprise, by the computerized system: continuously obtaining one or more KPIs with regard to the given AP; using the obtained KPIs for calculating, for the given AP, a congestion-indicative value; and enabling provisioning the given AP in accordance with downlink classification results only if the calculated congestion-indicative value is less than a predefined value of a congestion threshold.

In accordance with other aspects of the presently disclosed subject matter, there is provided a traffic control system capable of controlling traffic in a cellular network comprising a plurality of controlled access points (APs). The system comprises a processor operatively coupled to a memory and an interface circuit operatively coupled to the processor and the memory. The interface circuit is configured to continuously obtain data informative of resource utilization with regard to APs of the plurality of controlled APs. The processor is configured to: process data obtained via the interface circuit to continuously classify, for a given AP of the plurality of controlled APs, downlink load with respect to a downlink load threshold stored in the memory and uplink load with respect to an uplink load threshold stored in the memory, thereby giving rise to downlink and uplink classification results, wherein the processor is configured to provide uplink load classification independently of downlink load classification; and enable provisioning of the given AP in accordance with respective classification results, wherein: provisioning in accordance with downlink classification results comprises changing cell reselection parameters and/or changing cell footprint parameters; provisioning in accordance with uplink classification comprises changing cell selection parameters; and provisioning in accordance with uplink classification is enabled independently of provisioning in accordance with downlink classification.

In accordance with further aspects of the presently disclosed subject matter, provisioning the given AP in accordance with downlink classification results can be further enabled only if uplink classification results match predefined criteria. Optionally, downlink load classification of the given AP is enabled only when the uplink load of the given AP is classified as being below the load threshold.

In accordance with further aspects of the presently disclosed subject matter, the values of load thresholds can be predefined or the computerized system changes the values of load thresholds in accordance with predefined rules. Values of load thresholds of the given AP can differ from values of load thresholds of at least one other AP of the plurality of controlled APs.

In accordance with further aspects of the presently disclosed subject matter, data informative of resource utilization with regard to at least one AP can be obtained in a format differing from the format of data informative of resource utilization obtained with regard to at least one other AP.

In accordance with other aspects of the presently disclosed subject matter, there is provided a method of controlling traffic in a cellular network comprising a plurality of controlled access points (APs) configured to serve passengers in one or more trains in accordance with a train schedule. The method comprises: for each given AP from the plurality of APs, a) obtaining data informative of load in uplink and/or downlink, the load expected during a period scheduled in accordance with the train schedule and corresponding to expected substantive increase of passengers to be served by the given AP; b) processing the obtained data to classify the load expected in uplink with respect to an uplink load threshold and/or the load expected in downlink with respect to download threshold, thereby giving rise to uplink and/or downlink classification results; c) configuring provisioning actions in accordance with classifying results and d) enabling the configured provisioning actions at a scheduled time.

In accordance with other aspects of the presently disclosed subject matter, there is provided a computerized system capable of controlling traffic in a cellular network comprising a plurality of controlled access points (APs) configured to serve passengers in one or more trains in accordance with a train schedule, the system configured to enable operations a)-d) above.

Provisioning in accordance with downlink classification results can comprise changing cell reselection parameters and/or changing cell footprint parameters. Provisioning in accordance with uplink classification results can comprise changing cell selection parameters.

In accordance with further aspects of the presently disclosed subject matter, operations a)-c) can be provided in advance and respective data and provisional scripts can be stored in the computerized system.

Data informative of load expected in uplink and/or downlink can be derived in advance from the train schedule, estimated number of passengers to be served by the given AP during respectively scheduled period and statistic-based data informative of KPI and resource utilization of the given AP in the absence of trains. Number of passengers to be served by the given AP during the scheduled period can be estimated using a temporal pattern derived from statistical data informative of a number of passengers in train when passing during the scheduled period the area served by the given AP.

In accordance with further aspects of the presently disclosed subject matter, data informative of load expected in uplink and/or downlink during the scheduled period can be estimated in-advance using a temporal pattern derived by the computerized system from data informative of a respective load moving in a linear direction from one AP to another AP from the plurality of APs.

In accordance with further aspects of the presently disclosed subject matter, operation a) can be provided in a continuous manner. The computerized system can derive data informative of load expected in uplink and/or downlink of a given AP from data informative of load moving corresponding to moving a given train between one or more APs from the plurality of APs and preceding the given AP.

In accordance with further aspects of the presently disclosed subject matter, the continuously obtained data informative of the expected load of the given AP can be processed by the computerized system to continuously refine the provided in-advance classification.

The method can further comprise selecting, by the computerized system and among the stored provisional scripts, a script corresponding to the refined classification, and enable respectively selected provisioning actions at the scheduled time. Alternatively, the method can further comprise disabling, by the computerized system, the pre-scheduled provisioning actions if the refined classification meets a disable criterion.

In accordance with further aspects of the presently disclosed subject matter, the method can further comprise using, by the computerized system, the continuously obtained data informative of the expected load in a feedback loop for classification and pre-provisioning one or more next scheduled events.

In accordance with further aspects of the presently disclosed subject matter, the method can further comprise processing the continuously obtained data informative of load expected in uplink and/or downlink during the scheduled period to continuously classify the expected load and enabling provisioning the uplink and/or downlink of the given AP in accordance with classification results, the provisioning to be provided at the scheduled time in accordance with the trains schedule.

Among advantages of certain embodiments of the presently disclosed subject matter is capability to provide traffic control with no need of communication (e.g. for exchanging load information) between access points for load balancing and/or traffic steering purposes. Inter- and intra-RAT traffic control can be provided in a cellular network comprising access points of different vendors and/or of different standards.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "classifying", "calculating", "generating", "obtaining", "provisioning" or the like, refer to the action(s) and/or process(es) of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, the traffic control system disclosed in the present application.

It is to be understood that the term "non-transitory" is used herein to exclude transitory, propagating signals, but to include, otherwise, any volatile or non-volatile computer memory technology suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

The references cited in the background teach many principles of traffic control in a cellular network that may be applicable to the presently disclosed subject matter. Therefore the full contents of these publications are incorporated by reference herein where appropriate, for appropriate teachings of additional or alternative details, features and/or technical background.

Embodiments of the presently disclosed subject matter are not described with reference to any particular programming language. It will be appreciated that a variety of programming languages may be used to implement the teachings of the presently disclosed subject matter as described herein.

Figure 1:
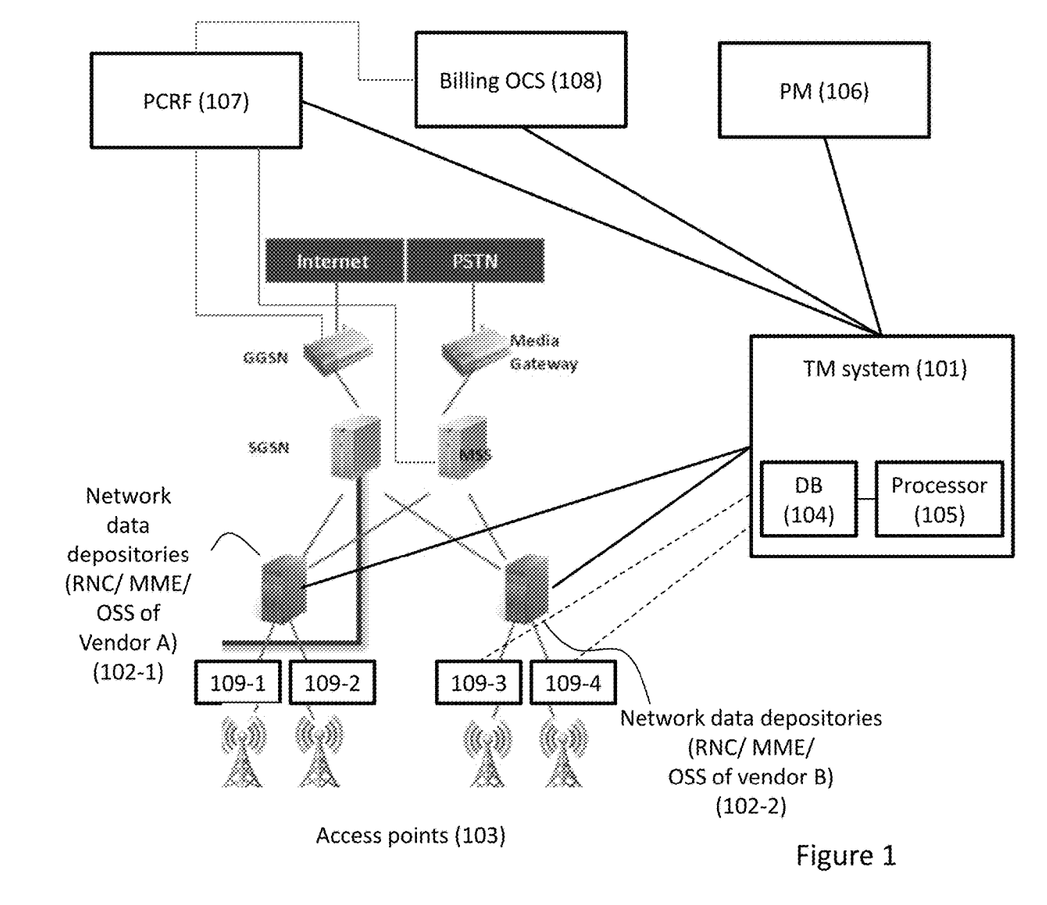
FIG. 1 illustrates a generalized network environment including a traffic control system configured in accordance with certain embodiments of the presently disclosed subject matter.

Bearing this in mind, attention is drawn to FIG. 1 illustrating a non-limiting example of a schematic network environment including a system capable of controlling traffic in accordance with certain embodiments of the presently disclosed subject matter and referred to hereinafter as a traffic control (TC) system. As illustrated in FIG. 1, the TC system (101) is operatively connected to one or more OSS (Operation and Support System) servers and/or to Radio Network Controller(s) (RNC) and/or Mobile Management Entities (MME) provided by one or more vendors (denoted as 102-1 and 102-2). Unless specifically stated otherwise, any depository of network-related data (e.g. OSS, RNC, etc.) is referred to hereinafter as a network data (ND) depository (102). The TC system (101) can be further operatively connected to a Performance Management (PM) node (106) and, optionally, to a Policy and Charging Rules Function (PCRF) node (107), billing system (108) and/or other client-related system.

The TC system is further operatively connected (by direct connection or through a mediation layer as, for example, OSS server) to a plurality of access points (103) to be controlled, the access points (APs) serving connected user equipments (UEs) and/or associated with idle UEs. The access points controlled by the TC system can be sectors (e.g. macrocells, picocells and femtocells, etc.) and/or groups thereof.

It is noted that access points within the plurality of access points can operate in different bands and/or RATs and can be provided by different vendors. For purpose of illustration only, the following description is provided with respect to a network operating under UMTS standard. The teachings of the presently disclosed subject matter are, likewise, applicable to other standards of $3^{rd}$ and next generations.

The TC system is configured to continuously receive network-related data and client-related data from one or more ND depositories and/or client-related systems.

Unless specifically stated otherwise, it is appreciated that throughout the specification the terms "continuously receiving data" refers to receiving (in push or pull mode) data substantially each time a new data is available to the TC system (e.g. with a period specified as minimal collection time for a certain ND depository, with a period specified as minimal collection time for a group of certain ND depositories, in a near real-time mode, etc.). In "pull" mode, the availability of new data can be defined by configuration of the TC system specifying when to pull the data. Likewise, the term "continuously obtaining data" refers to continuously receiving a given required data and/or processing the continuously received data in order to derive the given required data.

The TC system is configured to continuously obtain data informative of resource utilization (e.g. data informative of transmission power, downlink codes, downlink Channel Elements, uplink Channel Elements, uplink Received Total Wideband Power (RTWP), etc.). The TC system is further configured to continuously obtain data informative of network quality. Network Quality can be evaluated with the help of Key Performance Indicators (KPIs) indicative of a network's ability to provide given services with assured service level and/or end users' level of satisfaction with given services.

The obtained data can be stored in a database (104) operatively connected to a processor (105) configured to enable operations as detailed with reference to FIGS. 2-7.

The TC system 101 can receive from one or more network data (ND) depositories data indicative of network events and/or user-related events registered in the ND depositories and informative of resource utilization. By way of non-limiting example, the TC system can be configured to continuously receive (in push and/or pull mode) from one or more RNCs Performance Call History Record (PCHR) logs (or parts thereof) generated by RNC and collected thereon during a certain period of time $P_{ND}$ (e.g. time specified as minimal collection time for RNC). The TC system can be further configured to accommodate the received records and/or derivatives thereof in the database (104).

The TC system can be configured to derive data informative of resource utilization, KPIs and/or other quality related data directly from the obtained PCHR log records.

By way of non-limiting example, processing the PCHR log records can include deriving event messages informative of:

events related to soft handover (SHO) (e.g. a primary CPICH enters/leaves the reporting range; non-active primary CPICH becomes better than an active primary CPICH; change of best cell; a primary CPICH becomes better/worth than an absolute threshold, etc.);

events related to inter-frequency handover (IFHO) and/or inter-RAT handover (IRATHO) (e.g. change of best frequency, the estimated quality of the currently used frequency below/above a certain threshold, the estimated quality of a non-used frequency is below/above a certain threshold, estimated quality of the other system is below/above a certain threshold, change of best cell in other system, etc.);

cell performance logs, etc.

The TC system can be configured to filter and correlate the derived event messages and further generate performance-indicative counters. The TC system can further use data from the performance-indicative counters as data indicative of resource utilization.

Alternatively or additionally, the TC system can continuously receive KPIs or other performance-related data from different depositories (e.g. from the PM node 106).

Alternatively or additionally to receiving data collected in one or more network depositories, the TC system can be configured to continuously obtain data informative of resource utilization from a plurality of probe devices (illustrated as 109-1-109-4). The probe devices are operatively connected to the respective access points to sniff and/or monitor traffic between the access points and the RNC. The TC system can receive data directly through the probe devices (e.g. as illustrated for the probe devices 109-3 and 109-4) or via a network depository (e.g. as illustrated for the probe devices 109-1 and 109-2). The TC system can continuously receive data collected by the probe devices in near real-time mode, independently of collection periods of the network depositories.

In accordance with certain embodiments of the presently disclosed subject matter and as will be further detailed with reference to FIGS. 2-7, the TC system can be configured to process the obtained data informative of resource utilization status, KPIs and/or other quality related data and, thereby, to continuously monitor access points' load. The TS system can be further configured to dynamically recommend and/or provide, directly or indirectly, corrective actions with regard to one or more access points in accordance with the monitoring results.

Those versed in the art will readily appreciate that the teachings of the presently disclosed subject matter are not bound by the network architecture illustrated in FIG. 1, equivalent and/or modified functionality can be consolidated or divided in another manner and can be implemented in any appropriate combination of software, firmware and hardware. The TC system can be a standalone network entity, or integrated, fully or partly, with other network entities.

Figure 2:
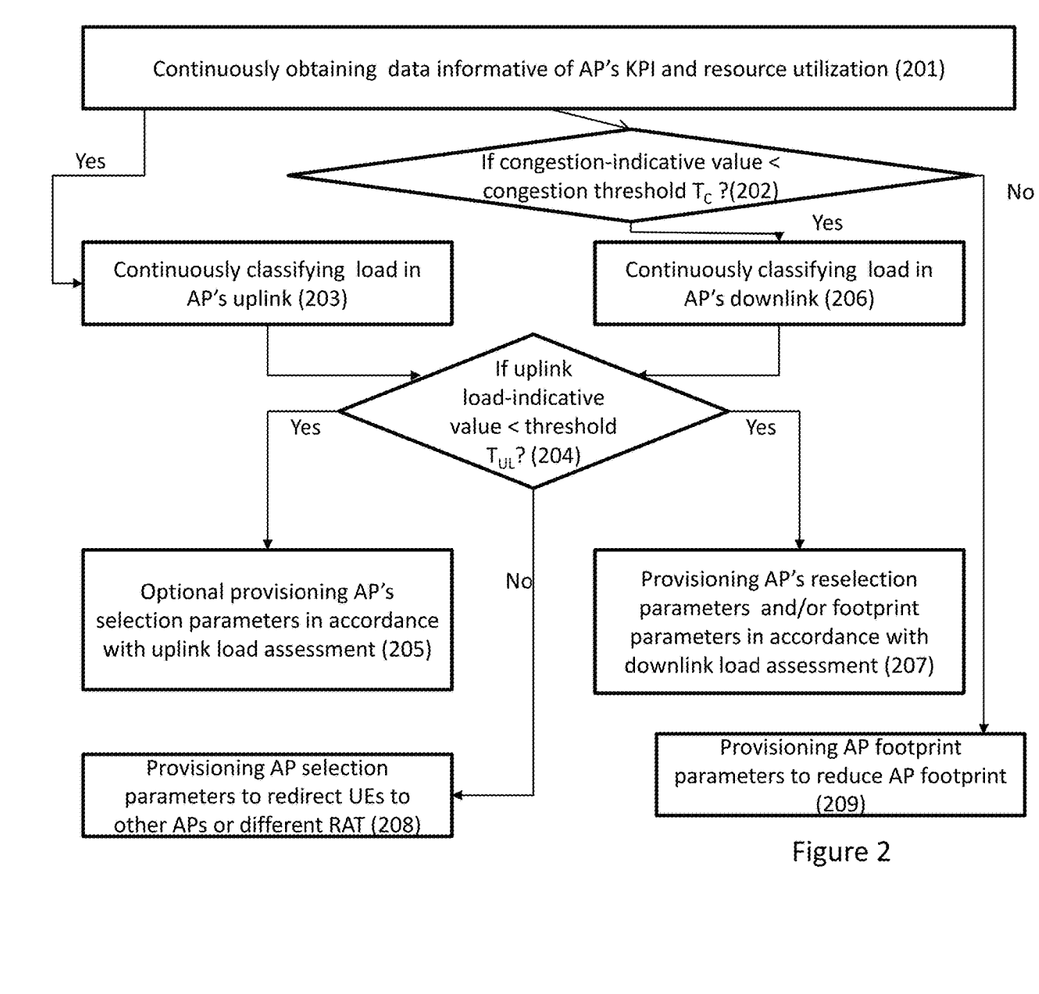
FIG. 2 illustrates a generalized flow chart of controlling traffic in an access point in accordance with certain embodiments of the presently disclosed subject matter.

Referring to FIG. 2, there is illustrated a generalized flow chart of controlling traffic in an access point in accordance with certain embodiments of the presently disclosed subject matter.

The TC system continuously obtains (201) data informative of congestion-indicative KPIs and radio resource utilization with regard to the plurality of access points (AP) to be controlled. Such data can be obtained by aggregating and, optionally, processing data received from the one or more ND depositories (102) and/or PM node (106). Optionally, the plurality of access points can comprise access points operating in different RATs and/or different bands and/or provided by different vendors, while data related to such access can be obtained in vendor-proprietary formats. KPIs can be informative of quality of service degradation caused by congestion as, by way of non-limiting example, Radio Resource Control (RRC) congestion ratio KPI, Radio Access Bearer (RAB) congestion ratio KPI, circuit switch (CS) congestion ratio KPI, packet switch (PS) congestion ratio KPI, etc., each congestion ratio indicative of the percentage of respective unsuccessful attempts within the total attempts.

For each given AP among the plurality of APs, the TC system uses respective KPIs obtained in operation (201) to continuously calculate (in accordance with predefined rules) for the given access point a congestion-indicative value and compares (202) the calculated congestion-indicative value with a value of congestion threshold $T_c$. The value of congestion threshold of a given access point can be predefined by an operator. Optionally, during the operation, the TC system can change the value of the congestion threshold responsive to network conditions (e.g. load conditions in a certain group of APs, load conditions in the entire network or a respective part thereof, changes of a privilege level of the given AP, certain situations (as e.g. the occurrence of special, optionally scheduled events, time of day, emergency situations, and so on), etc.) in accordance with predefined rules. A value of congestion threshold can be different for different APs. By way of non-limiting example, the congestion-indicative value can be calculated as the highest value among the obtained values of KPIs within a predefined set of congestion-indicative KPIs (e.g. RRC Congestion KPI, RAB CS congestion KPI and RAB PS congestion KPI). Optionally, this value can be calculated as a weighted average value of the obtained values of congestion-indicative KPIs in the set or otherwise.

If the congestion-indicative value for the given access point equals or exceeds the respective value of the congestion threshold, the TC system enables, responsive to respective classification results, provisioning (209) of AP footprint parameters so as to reduce coverage of the given AP. Reducing coverage can be achieved by reducing AP's transmit power (e.g. Common Pilot Channel (CPICH) power in UMTS), by down tilting the antenna, by changing azimuth of the access point or by a combination of two or more of such actions. Footprint parameters of the given access point can be reduced in a gradual manner. As illustrated by way of non-limiting example in FIG. 3, the TC system can be configured to handle a plurality 300 of consecutively increasing congestion provisional thresholds $T_{cpi}$, wherein the congestion threshold $T_c$ is the lowest congestion provisional threshold in the plurality. The TC system can be further configured to enable provisioning of the given access point in accordance with the relationship of the congestion-indicative value (CIV) and consecutive congestion provisional thresholds. For example, if $T_c = T_{cp1} \leq CIV < T_{cp2}$, the TC system enables (301) reduction of AP footprint parameter(s) to $1^{st}$ level; if $T_{cp2} \leq CIV < T_{cp3}$, the TC system enables (302) reduction of AP footprint parameter(s) to $2^{nd}$ level; and if $T_{cp3} \leq CIV$, the TC system enables (303) reduction of AP footprint parameter(s) to the $3^{rd}$ level. Table 1 illustrates a non-limiting example of a plurality of congestion provisional thresholds and reduction of CPICH Power to be provided, corresponding to different provisional thresholds.

TABLE 1

Figure 3:
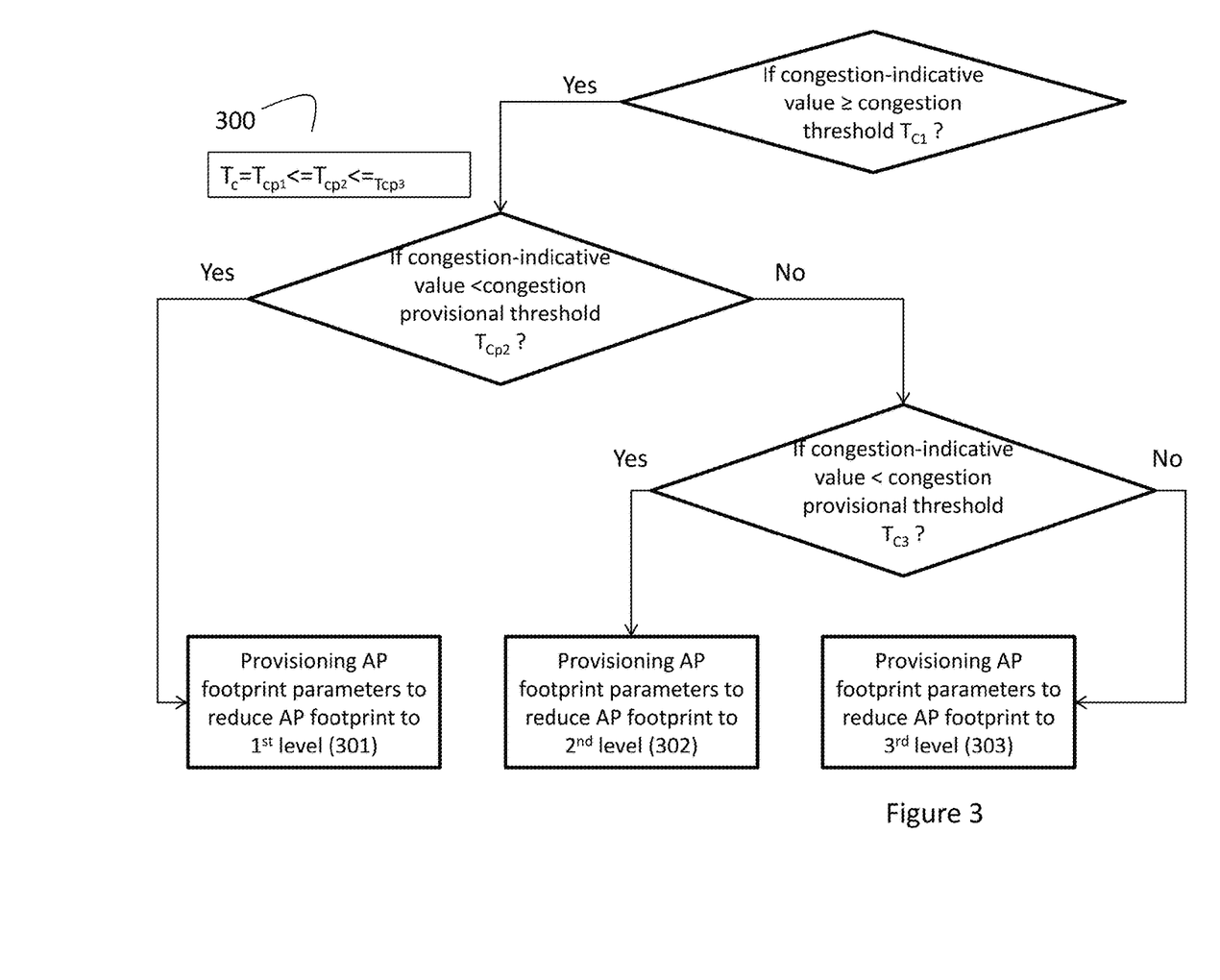
FIG. 3 illustrates a generalized flow chart of gradually reducing footprint parameters of an access point in accordance with certain embodiments of the presently disclosed subject matter.

| Congestion Provisional Thresholds | Decision | CPICH Power Down |
|---|---|---|
| $T_{cp1}$ = 0.1% | $1^{st}$ level | 0.2 dB |
| $T_{cp2}$ = 0.5% | $2^{nd}$ level | 0.5 dB |
| $T_{cp3}$ = 1.0% | $3^{rd}$ level | 1.0 dB |

Referring back to FIG. 2, for each given AP among the plurality of APs, the TC system continuously classifies (203) an uplink (UL) load and separately continuously classifies (206) a downlink (DL) load. The TC system provides classification using data informative of radio resource utilization during a classification period. Optionally (as illustrated by way of non-limiting example in FIG. 2), the classification of UL and/or DL load can be provided only when the congestion-indicative value is below the value of the congestion threshold.

Unless specifically stated otherwise, it is appreciated that throughout the specification the term "continuously classifying data" refers to providing classification operation responsive to predefined events (e.g. receiving new data available to the TC system, receiving classification triggering notification, in accordance with a schedule, periodically, etc.).

Unless specifically stated otherwise, it is appreciated that throughout the specification the term "classification period" refers to a period between starting collection of data involved in a given classification decision and taking the given classification decision. Optionally, duration of the classification period can be equal to the duration of the collection period configured for the TC system. In a case of near real-time data collection, duration of a classification period can be configured in accordance with processing capabilities of the TC system and/or provisioning-related requirements.

Optionally, duration of a classification period can be differently configured for uplink and downlink.

Load classification of a downlink can be provided based on one or more load-indicative values calculated for one or more radio resources (e.g. transmission power, DL codes, DL channel elements and UL channel elements, etc.) during a classification period. Calculating the downlink load-indicative values and providing respective load classification is further detailed with reference to FIG. 4.

The uplink load-indicative value can be informative of available signals, noise, and interference in the uplink and, by way of non-limiting example, can be calculated as equal to Received Total Wideband Power (RTWP). Received Total Wideband Power is the total power of all signals received in the uplink frequency band on the cell antenna, irrespective of whether or not these signals are uplink physical channels sent by UEs, or interference from an outside source. The uplink is classified as "loaded" if the uplink load-indicative value equals or exceeds a value of uplink load threshold $T_{UL}$.

Optionally, the TC system can be configured to provide the classification of DL load only when the uplink load-indicative value is below the value $T_{UL}$ of uplink load threshold.

Figure 4:
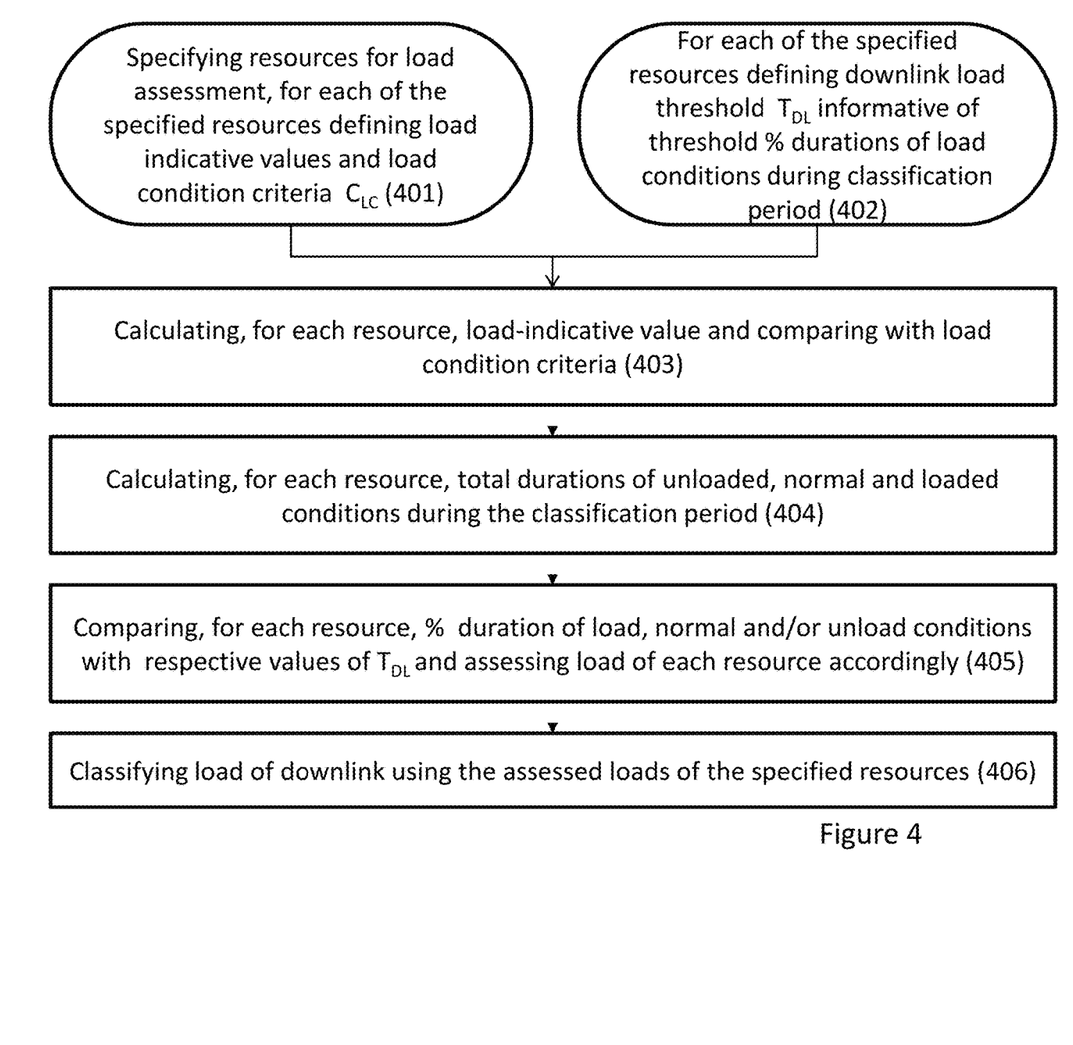
FIG. 4 illustrates a generalized flow chart of classifying an access point's downlink load in accordance with certain embodiments of the presently disclosed subject matter.

Referring to FIG. 4, there is illustrated a non-limiting example of classifying a downlink load of an AP among the plurality of APs to be controlled.

In accordance with certain embodiments of the presently disclosed subject matter, the TC system is configured to handle (401) definitions of load-indicative values and respective load condition criteria $C_L$ for each of resources specified (e.g. by a network operator) to be used for load assessment of a downlink. By way of non-limiting example, the resources to be used for assessment can be specified on a cell/sector level (e.g. transmission power, DL channelization codes), NodeB/site level (e.g. DL channel elements and uplink channel elements, Iub Throughput UL/DL) and/or backhaul level (e.g. NodeB Iub Transport Throughput); and load-indicative values can be defined as availability of respective radio resource averaged by UEs associated with a given AP during the classification period (including idle UEs). By way of non-limiting example, the following set of load-indicative values can be calculated for the classification period: value indicative of available transmission power per associated UE, value indicative of available DL codes per associated UE; value indicative of available DL channel elements per associated UE; and value indicative of available UL channel elements per associated UE.

Non-limiting examples of load-indicative values and respective load condition criteria are illustrated in Table 2.

TABLE 2

| Load indicative value | $C_L$ for loaded condition | $C_L$ for normal condition | $C_L$ for unloaded condition |
|---|---|---|---|
| Available % of TxPower per UE | <10% | 10% >= x =< 25% | >25% |
| Available % Codes per UE | <6% | 6% >= x =< 25% | >25% |
| Available % Channel Elements DL | <30% | 30% >= x=< 60% | >60% |
| Available % Channel Elements UL | <30% | 30% >= x=< 60% | >60% |

The TC system is further configured to handle (402), for each of the specified resources, values of downlink load threshold $T_{DL}$ informative of threshold relative durations of different load conditions in the downlink (e.g. % of unloaded, normal, overloaded conditions during a classification period).

By way of non-limiting example, values of downlink load threshold $T_{DL}$ can be equal for each of resources in Table 2 and indicate that the respective resource is unloaded during a given classification period if it was in unloaded condition at least 90% of the given classification period, and that the respective resource is loaded during a given classification period if it was in loaded condition at least 10% of the given classification period.

Values of load condition criteria and/or load threshold(s) of a given access point can be predefined or, optionally, can be dynamically changed by the TC system in accordance with predefined rules (e.g. depending on load conditions in a certain group of APs, load conditions in the entire network or a respective part thereof, changes of a privilege level of the given AP, certain situations, etc.). By way of non-limiting example, the load condition criteria can be calibrated so that a certain part of APs may be calibrated as loaded.

Depending on vendors of network equipment, data informative of resource utilization can be received in different formats. By way of non-limiting example, in case of vendor A, TC system can receive, with regard to each AP among the plurality of APs, data informative of resource utilization which has been continuously measured (e.g. every second) and collected by RNC during a minimal collection period (e.g. 15 minutes) specified for RNC. In case of vendor B, the TC system can receive, with regard to each AP among the plurality of APs, derivatives of the measured and collected in NDs data (e.g. a histogram indicative of distribution of occupied resources and number of associated UEs during the collection period). In such cases, intermediate processing can be required prior to and/or during the classification operation.

Optionally, load condition criteria and/or downlink load threshold(s) can differ for different access points depending on vendor, location (e.g. urban or rural), etc.

The TC system uses the obtained data informative of resource utilization for calculating, for each specified resource, load-indicative value and comparing (403) the calculated value with load condition criteria. Thus, the TC system defines unloaded, normal and overloaded conditions of downlink at different points-in-time (or periods), and further calculates (404), for each specified resource, total durations of unloaded, normal and overloaded conditions during the classification period and calculates relative duration(s) of these conditions during the classification period. The TC system further compares, for each resource, the calculated relative duration(s) with downlink load threshold $T_{DL}$ and assesses (405) load of each resource accordingly. The TC system further uses the assessed loads of the specified resources for classifying (406), in accordance with predefined rules, the load of AP's downlink during the classification period. A non-limiting example of predefined rules is illustrated in Table 3. In the example the downlink is classified as loaded if at least one resource is classified as loaded during the classification period; the downlink is classified as normal if at least one resource is classified as normal and none of the resources is classified as loaded during the classification period; and the downlink is classified as unloaded if all resources are classified as unloaded during the classification period.

TABLE 3

| Classification of AP Load Condition | Rule |
|---|---|
| Loaded | At least one resource is classified as loaded |
| Normal | At least one resource is classified as normal and none of the resources is classified as loaded |
| Unloaded | All resources are classified as unloaded |

The following is a non-limiting example of load assessment for transmission power in cases where data informative of resource utilization is obtained in the format of a histogram. In accordance with certain embodiments of the presently disclosed subject matter, upon receiving histograms indicative of distribution of transmission power and number of associated UEs during the classification period, the TC system provides the following calculations:
  calculating average load per UE in each period in a received histogram;
  using the resulted resource load distribution for calculating distribution of percentage of resources available per each HS user;
  interpolating the resulted distribution as a normal distribution $$P(x) = \frac{1}{\sigma\sqrt{2\pi}} e^{-(x-\mu)^2/(2\sigma^2)}$$

estimating the probability P that:
  a. % of transmission power available per each UE is lower than the load criteria for load conditions for transmission power resource;
  b. % of transmission power available per each UE is higher than the load criteria for unload conditions for transmission power resource;
calculating relative duration of load and unload conditions
  Time_Percentage_Loaded=($\Sigma$ P_loaded*time_interval_i)/Total_time Time_Percentage_Unloaded=_($\Sigma$ P_unloaded*time_interval_i)/Total_time comparing the relative durations with respective values of $T_{DL}$ and assessing the load of each resource accordingly:
  if Time_Percentage_Loaded>$T_{DL}$ value for percentage of loaded time, then the transmission power resource is loaded,
  if Time_Percentage_Unloaded>$T_{DL}$ value for percentage of unloaded time, then the transmission power resource is unloaded;
  otherwise the transmission power resource is in normal condition.

In cases where data informative of utilization of other resources are obtained in the format of a histogram, the TC system can provide load assessment of such resources in a manner similar to the above.

Referring back to FIG. 2, upon receiving results of uplink and downlink classification, the TC system enables desirable provisioning of AP. In accordance with certain embodiments of the present invention, the provisioning can include generating, by the TC system, a respective provisioning script and enabling its further execution. By way of non-limiting example, the generated provisioning script can be delivered to OSS and executed responsive to a command provided by the TC system (e.g. via Telnet) or by OSS.

As detailed above, the TC system is configured to classify uplink load independently of classifying downlink load. The TC system is further configured to provision cell selecting parameters in accordance with uplink classification results independently of provisioning cell reselection parameters or cell footprint parameters. If uplink load-indicative value (e.g. RTWP) equals or exceeds a value of uplink load threshold $T_{UL}$, the TC system enables, responsive to respective classification results, provisioning (208) of AP cell selection parameters to redirect idle UEs to other APs and/or different RAT. By way of non-limiting example, a cell selection parameter can be a QRxLevMin parameter indicative of the minimum RSRP requirement for cell selection or QRxQualMin indicative of the minimum quality requirement for cell selection. Optionally, if the uplink load-indicative value is lower than a value of uplink load threshold $T_{UL}$, the TC system enables, responsive to respective classification results, provisioning (205) of AP admission control parameters so to decrease minimal requirements for cell selection. Optionally, the requirements for cell selection (e.g. QRxLevMin, QRxQualMin) can be increased in a gradual manner using a plurality of increasing provisional thresholds $T_{ULP}$>$T_{UL}$. Likewise, the requirements for cell selection can be decreased in a gradual manner in accordance with uplink load classification results.

A non-limiting example of the decision making process for AP provisioning, based on uplink classification and congestion classification, is summarized in Table 4.

TABLE 4

| AP congestion-indicative value (CIV) vs. $T_C$ value | Uplink load-indicative value (LIV)$_{UL}$ vs. $T_{UL}$ value | Provisioning decision |
|---|---|---|
| CIV > $T_C$ | (LIV)$_{UL}$ > $T_{UL}$ | QRXLEVMIN Up CPICH Down |
| CIV > $T_C$ | (LIV)$_{UL}$ < $T_{UL}$ | QRXLEVMIN down CPICH Down |
| CIV < $T_C$ | (LIV)$_{UL}$ > $T_{UL}$ | QRXLEVMIN Up |
| CIV < $T_C$ | (LIV)$_{UL}$ < $T_{UL}$ | QRXLEVMIN down CPICH Up (subject to load classification of downlink) |

As detailed above, the TC system can be configured to classify downlink load independently of classifying uplink load. The TC system can be further configured to provision (207) cell reselection parameters and/or cell footprint in parameters in accordance with downlink classification results only under condition that the congestion-indicative value (CIV) is lower than the value of congestion threshold $T_C$ and uplink load-indicative value is lower than the value of uplink load threshold $T_{UL}$. Subject to these conditions, and responsive to respective classification results, the TC system enables provisioning (207) of cell reselection parameters (and, optionally, cell footprint control parameters) independently of provisioning of cell selection parameters in accordance with uplink classification results.

Figure 5:
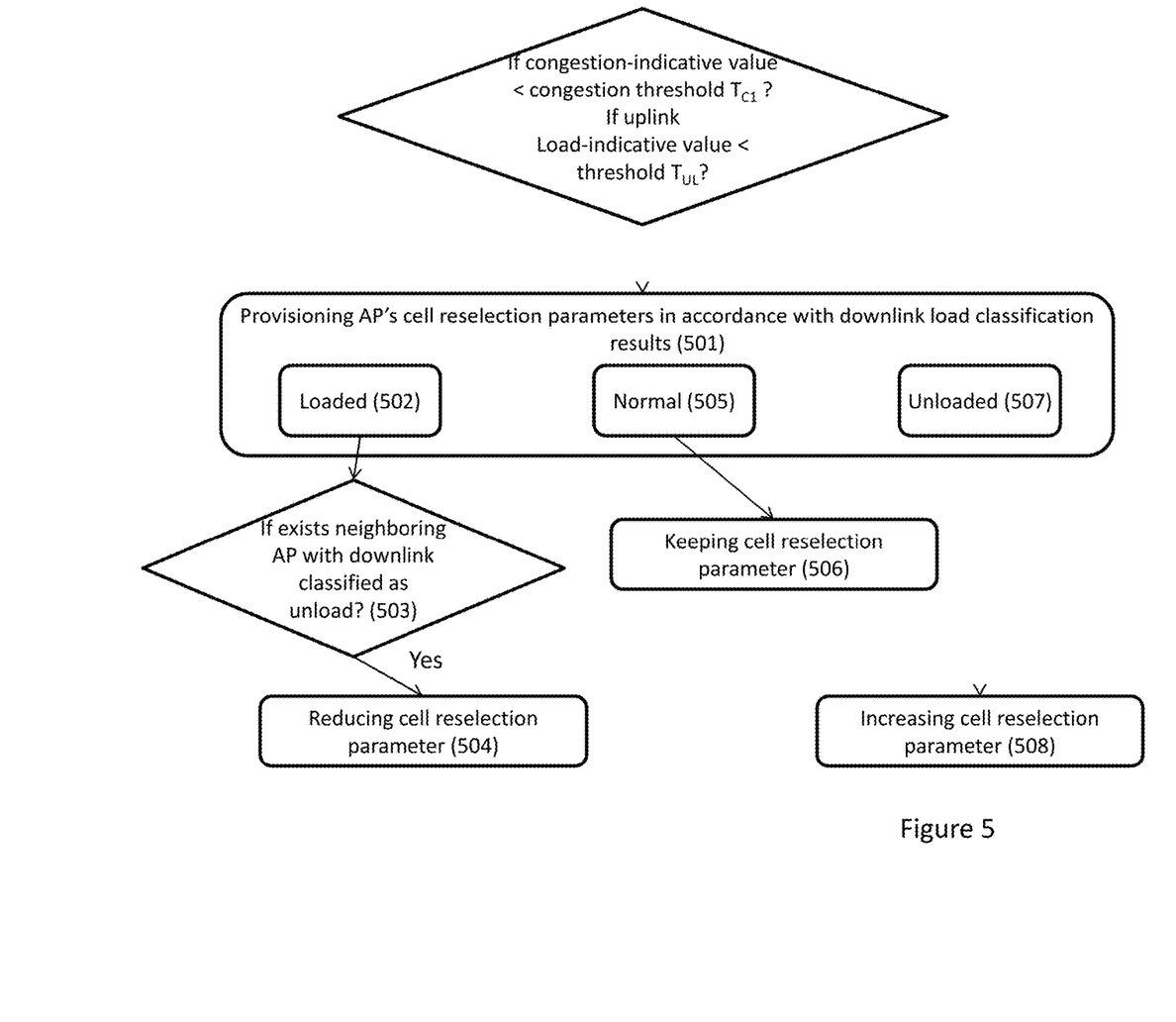
FIG. 5 illustrates a generalized flow chart of provisioning AP's reselection parameters in accordance with downlink load classification.

Provisioning of AP's reselection parameters in accordance with downlink load classification is further detailed with reference to FIG. 5.

Subject to congestion-indicative value (CIV) lower than value of congestion threshold $T_C$ and uplink load-indicative value lower than value of uplink load threshold $T_{UL}$, the TC system enables provisioning (501) of cell reselection parameters (e.g. Qhyst, Qoffset, etc.) in accordance with the classification results. If, according to the classification results, the given AP is loaded, the TC system checks downlink classification results of APs neighboring the given AP in order to define (503) at least one neighboring AP with downlink classified as unloaded. If such neighboring AP is found, the TC system enables reduction (504) of a reselection parameter of the given AP (e.g. Qhyst2 can be reduced from 2 dB to 0 dB) and respective increasing of a reselection parameter of the found neighboring AP (e.g. Qoffset can be increased by additional 2 dB). No provisioning is provided in this case if no unloaded neighbors are found.

If, according to the classification results, the given AP is in normal condition (505), the TC system keeps (506) reselection parameters of the given AP unchanged. In case of unloaded condition of the given AP, the TC system increases the reselection parameters (e.g. Qhyst2 can be increased from 2 dB to 4 dB).

Among advantages of certain embodiments of the presently disclosed subject matter is capability of provisioning reselection parameters using results of downlink classification provided in multi-vendor and/or multi-RAT networks and/or multi-band networks.

Figure 6:
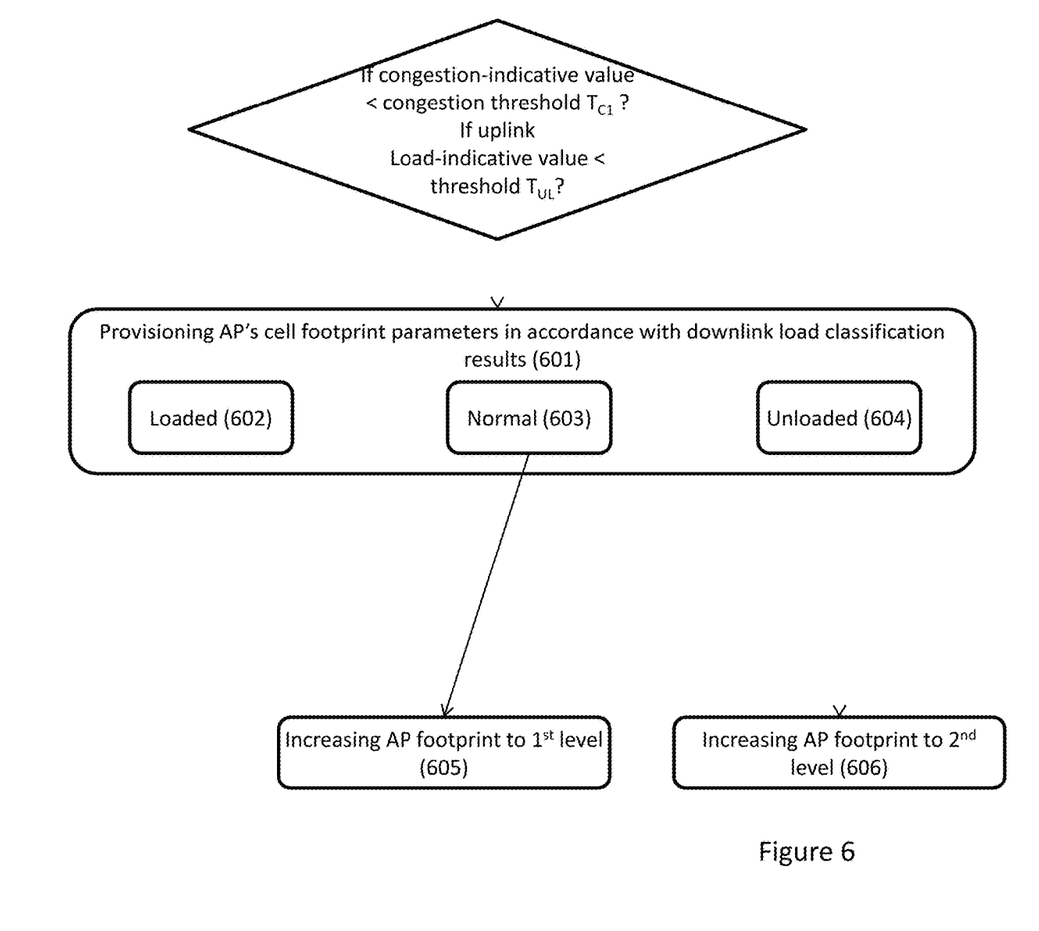
FIG. 6 illustrates a generalized flow chart of provisioning AP's footprint parameters in accordance with downlink load classification.

Provisioning of AP's footprint parameters in accordance with downlink load classification is further detailed with reference to FIG. 6.

Subject to congestion-indicative value (CIV) lower than value of congestion threshold $T_C$ and uplink load-indicative value lower than value of uplink load threshold $T_{UL}$, the TC system enables provisioning (601) of cell footprint parameters in accordance with the classification results. If, according to the classification results, the given AP is in normal condition (603), the TC system increases (603) the cell's coverage to a first predefined level (e.g. by increasing CPICH by 0.2 dB). In case of unloaded condition (604) of the given AP, the TC system increases (606) the cell's coverage to a second predefined level (e.g. by increasing CPICH by 0.5 dB).

Provisioning of AP's footprint parameters in accordance with downlink load classification can be provided independently of provisioning of AP's reselection parameters. However, ability to provision AP's footprint parameters in accordance with downlink load classification can be limited by different regulations (e.g. maximal CPICH specified for a given AP and/or a given frequency).

Figure 7:
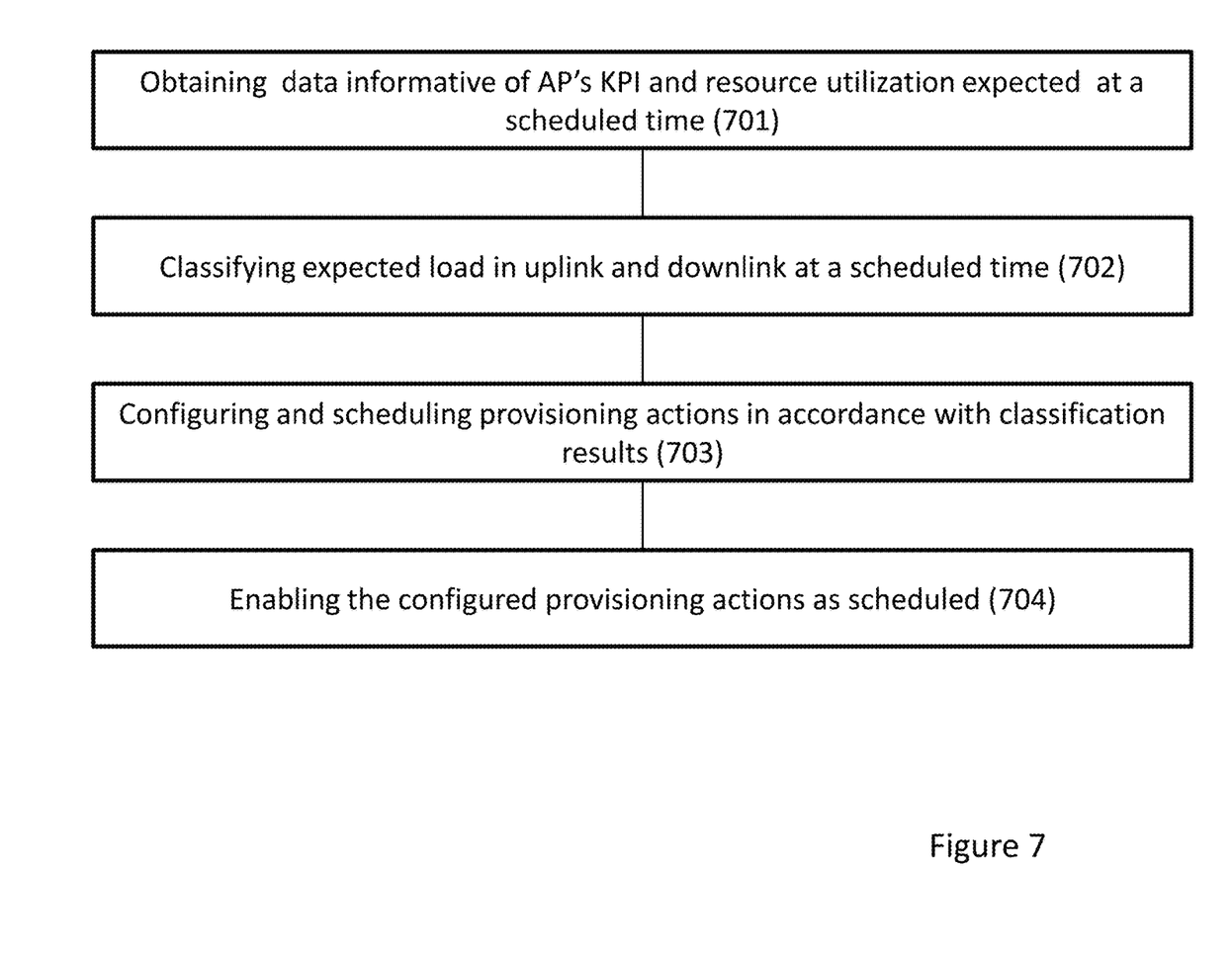
FIG. 7 illustrates a generalized flow chart of a scheduled controlling traffic in an access point in accordance with certain embodiments of the presently disclosed subject matter.

Referring to FIG. 7, there is illustrated a generalized flow chart of a scheduled control of traffic in an access point.

In certain use cases, changes in a number of UEs associated with a given access point can be estimated in advance. For example, substantive changes in a number of UEs associated with each of a plurality of access points located along a railway and serving the passengers in trains, occur in accordance with the trains' schedule.

In accordance with certain embodiments of the presently disclosed subject matter, the TC system can be configured to pre-provision access points located along a railway and serving the passengers in trains (referred to hereinafter as "involved APs) in accordance with KPI and resource utilization which are expected at a scheduled time.

For each given AP from the plurality of involved AP's, TC system can be configured to obtain (701) data informative of expected load in uplink and/or downlink during a period corresponding to a scheduled substantive increase of passengers to be served.

The TC system can be further configured to classify (702) the load expected during the scheduled period in uplink and/or downlink, and to configure and schedule (703) provisioning actions accordingly.

The provisioning actions can be configured in accordance with algorithm and criteria detailed with reference to FIGS. 2-6 and can be scheduled in accordance with a train schedule related to given access points and neighbors thereof. The respective classification period can be defined as a period of serving respective train(s) during the scheduled event (i.e. the period of substantial change in number of UEs associated with respective AP and respective train).

The TC system is further configured to enable (704) the configured provisioning actions as scheduled.

Operations (701)-(703) can be provided in advance and respective data and provisional scripts can be stored in the TC system.

Optionally, data informative of load expected during a scheduled period can be derived considering actual KPI and/or resource utilization prior to the scheduled time. In such cases, the classification period can be extended to a predefined-duration period prior to the scheduled event (i.e. to a period corresponding to passing a predefined number (e.g. four) of preceding APs), and decisions on provisional actions can be taken at the scheduled time in accordance with respective classification results.

Data informative of load expected in uplink and/or downlink can be derived in advance from the known train schedule, estimated number of passengers to be served by the given AP at a scheduled period and statistic-based data informative of KPI and resource utilization of the given AP in the absence of trains. Number of passengers to be served by the given AP at a scheduled period can be estimated in advance using a temporal pattern derived from statistical data informative of a number of passengers in respective trains when passing the area served by the given AP. Statistic-based data informative of KPI and resource utilization of the given AP in absent of trains can be derived from data collected by TC system during statistically sufficient period, with respect to the given AP.

Alternatively or additionally, data informative of load expected in uplink and/or downlink at a scheduled period can be estimated in-advance using a temporal pattern derived by TC system from data informative of a respective load moving from one involved AP to another in a linear direction along the railroad, such data can be collected by TC system during statistically sufficient period (e.g. several days).

Alternatively or additionally, TC system can be configured to provide operation 701 in a continuous manner. TC system can derive data informative of load expected in uplink and/or downlink from data informative of load moving between one or more involved APs preceding the given AP, the moving being responsive to moving a given train. Such data can be collected by TC system before the given train reaches an area served by the given AP.

TC system can be configured to use the continuously obtained data informative of the expected load to continuously refine the provided in-advance classification. TC system can be further configured to disable the scheduled provisioning actions if the refined classification meets a disable criterion. Optionally, TC system can be configured to select, among the stored provisional scripts, a script corresponding to the refined classification, and enable respectively selected provisioning actions at the schedule time.

Optionally, TC system can be configured to use the continuously obtained data informative of the expected load in a feedback loop for classification and pre-provisioning next scheduled events.

Alternatively, TC system can use the continuously obtained data informative of load expected in uplink and downlink during a scheduled period for continuous classification of the expected load. Classification period in this case can be defined as a period of collecting data informative of load moving in respect of one or more preceding APs of the plurality of involved APs. TC system can be further configured to enable provisioning the uplink and/or downlink of the given AP in accordance with classification results, the provisioning to be provided at the scheduled time in accordance with the trains schedule.

It is noted that the detailed above scheduled traffic control is, likewise, applicable to other use cases with a predictable schedule of substantive changes in a number of UEs associated with respective access points.

Figure 8:
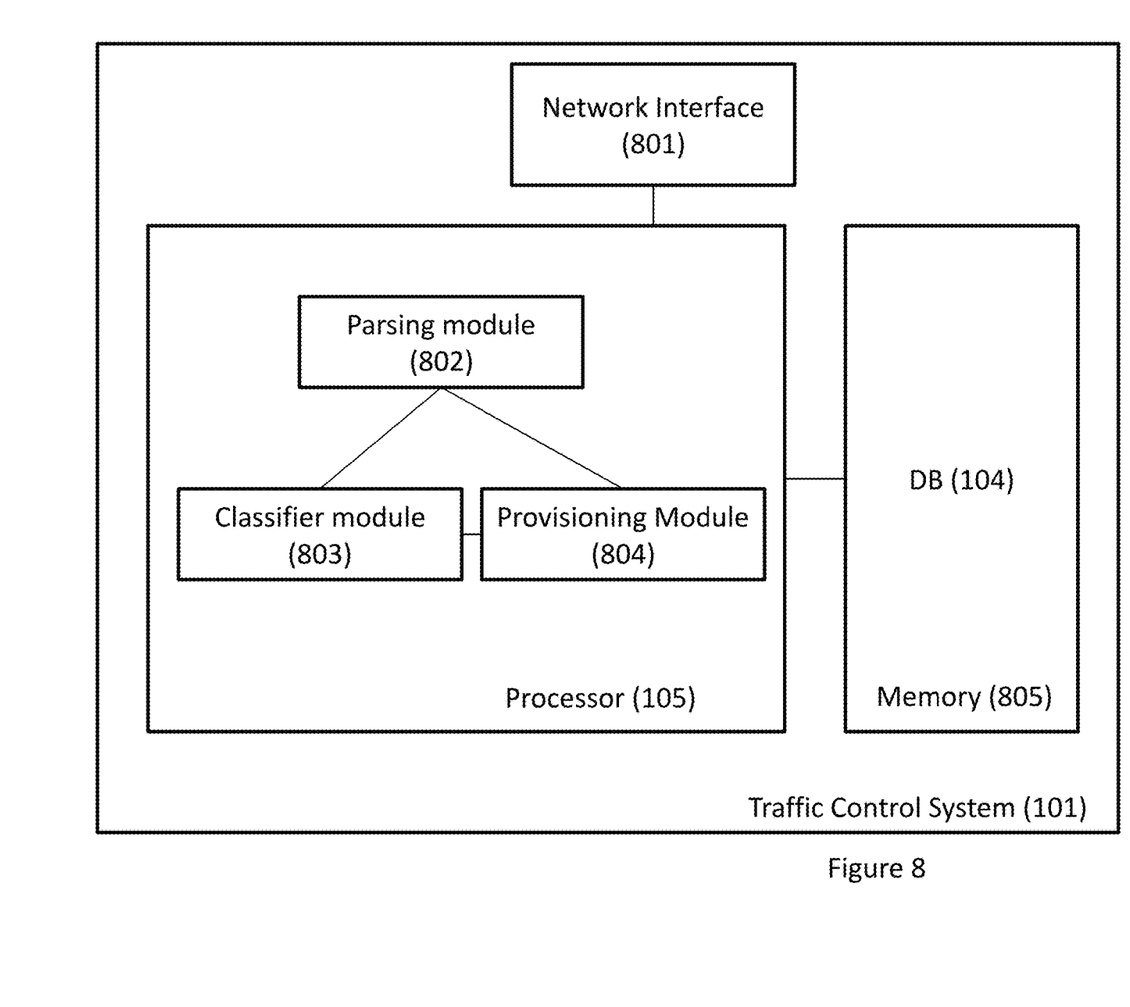
FIG. 8 illustrates a generalized functional diagram of the traffic control system in accordance with certain embodiments of the presently disclosed subject matter.

Referring to FIG. 8, there is illustrated a generalized functional diagram of a TC system in accordance with certain embodiments of the presently disclosed subject matter. The TC system (101) can be implemented as a stand-alone platform or integrated, fully or partly, with other network entities (e.g. OSS, PCRF, etc.). The TC system comprises a processor (105) operatively coupled to an interface circuit (801) (e.g. a port). The interface circuit (801) is configured to continuously receive from ND depositories data informative of network events and to forward the received data and/or derivatives thereof to the processor 105 and/or database 104 operatively coupled to the processor. The interface circuit is further configured to continuously receive KPIs or other quality-related data (e.g. from the PM node). The processor 105 is configured to provide necessary processing of the received data in accordance with operations detailed with reference to FIGS. 2-7. Memory 805 operatively coupled to the processor 105 is configured to accommodate all thresholds, load criteria and predefined rules detailed with reference to FIGS. 2-7.

The processor (105) can be configured to execute several functional modules in accordance with computer-readable instructions implemented on a non-transitory computer usable medium. Such functional modules are referred to hereinafter as comprised in the processor.

In accordance with certain embodiments of the presently disclosed subject matters, the processor can comprise operatively coupled parsing module 802, classifier module 803 and provisioning module 804. The parsing module 802 can be configured to process the received data to derive data indicative of resource utilization status and/or quality related data from the log records accommodated in the database 104. The classifier module 803 can be configured to continuously assess congestion and load conditions as detailed with reference to FIGS. 2-7 and forward the results of classification to the provisioning module 804 and to the memory 805. The provisioning module 804 is configured to generate provisioning scripts in accordance with the classification results and provide them to OSS for further execution. Optionally, the provisioning module can be configured to send an execution command for initiating the provisioning scripts.

Those skilled in the art will readily appreciate that the presently disclosed subject matter is not bound by the configuration of FIG. 8; equivalent and/or modified functionality can be consolidated or divided in another manner and can be implemented in any appropriate combination of software, firmware and hardware.

It is to be understood that the presently disclosed subject matter is not limited in its application to the details set forth in the description contained herein or illustrated in the drawings. The presently disclosed subject matter is capable of other embodiments and of being practiced and carried out in various ways.

It will also be understood that the presently disclosed subject matter further contemplates a non-transitory machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of controlling traffic in a cellular network comprising a plurality of controlled access points (APs) configured to serve passengers, the method comprising:
   prior to a scheduled event defined in accordance with a train schedule and associated with an expected substantive increase of passengers to be served by an operation in accordance with a cellular standard AP from the plurality of APs, obtaining, by a computerized system, pre-calculated expected classification results indicative of an expected, during the scheduled event, load of the AP with respect to a downlink and/or uplink load thresholds;
   at a scheduled time corresponding to the scheduled event, enabling, by the computerized system, providing one or more pre-configured provisioning actions pre-scheduled in accordance with the pre-calculated expected classification results, wherein the provisioning actions are actions enabling at least one of: changing cell reselection parameters, changing cell footprint parameters and changing cell selection parameters, and
   continuously collecting, by the computer system, data informative of the expected load to continuously refine the pre-calculated expected classification results.

2. The method of claim 1, wherein the expected classification results and respective provisioning actions are provided independently for uplink and for downlink, wherein the provisioning actions in accordance with downlink expected classification results comprise at least one of: changing cell reselection parameters and changing cell footprint parameters; and the provisioning actions in accordance with uplink expected classification results comprise changing cell selection parameters.

3. The method of claim 1, wherein the passengers are served in one or more trains moving in accordance with the train schedule.

4. The method of claim 1, wherein the expected classification results are pre-calculated using data derived from the train schedule, an estimated number of passengers to be served by the AP during the scheduled event and statistic-based data informative of KPI and resource utilization of the AP in the absence of passengers to be served.

5. The method of claim 1, further comprising continuously collecting, by the computerized system, statistical data informative of a load moving between APs from the plurality of APs in correspondence with the train schedule, wherein the expected classification results are pre-calculated using data derived from said statistical data.

6. The method of claim 1, further comprising disabling the pre-scheduled provisioning actions when the refined pre-calculated expected classification results meet a disable criterion.

7. The method of claim 1, further comprising using the expected classification results to select the one or more pre-configured provisioning actions to be provided.

8. The method of claim 1, further comprising:
prior to the scheduled event, collecting by the computerized system data informative of load moving between APs from the plurality of APs, the load moving being responsive to moving one or more trains in accordance with the train schedule; and
processing the collected data to obtain data informative of the expected load of the AP during the scheduled event.

9. A traffic control system capable of controlling traffic in a cellular network comprising a plurality of controlled access points (APs) configured to serve passengers, the system comprising a processor operatively coupled to a memory and an interface circuit operatively coupled to the processor and the memory, wherein
the processor is configured to:
prior to a scheduled event defined in accordance with a train schedule and associated with an expected substantive increase of passengers to be served by an operation in accordance with a cellular standard AP from the plurality of APs, to obtain pre-calculated expected classification results indicative of an expected, during the scheduled event, load of the AP with respect to a downlink and/or uplink load thresholds;
at a scheduled time corresponding to the scheduled event, enable providing one or more pre-configured provisioning actions in accordance with the pre-calculated expected classification results, wherein the provisioning actions are actions enabling at least one of: changing cell reselection parameters, changing cell footprint parameters and changing cell selection parameters, and wherein the one or more pre-configured provisioning actions are pre-scheduled in accordance with the pre-calculated expected classification results and respective scripts are stored in the memory; and
interface circuit is configured to continuously collect data informative of the expected load, and the processor is further configured to continuously refine the pre-calculated expected classification results in accordance with the collected data.

10. The system of claim 9, wherein the processor is configured to provide the expected classification results and respective provisioning actions independently for uplink and for downlink and wherein the provisioning actions in accordance with downlink expected classification results comprise at least one of: changing cell reselection parameters and changing cell footprint parameters; and the provisioning actions in accordance with uplink expected classification results comprise changing cell selection parameters.

11. The system of claim 9, wherein the passengers are served in one or more trains moving in accordance with the train schedule.

12. The system of claim 9, wherein the expected classification results are pre-calculated using data derived from the train schedule, an estimated number of passengers to be served by the AP during the scheduled event and statistic-based data informative of KPI and resource utilization of the AP in the absence of passengers to be served.

13. The system of claim 9, further comprising an interface circuit operatively coupled to the processor and the memory and configured to continuously collect statistical data informative of a load moving between APs from the plurality of APs in correspondence with the train schedule, wherein the processor is further configured to pre-calculate the expected classification results using data derived from said statistical data.

14. The system of claim 9, wherein the processor is further configured to disable the pre-scheduled provisioning actions when the refined pre-calculated expected classification results meet a disable criterion.

15. The system of claim 9, further comprising an interface circuit operatively coupled to the processor and the memory and configured to collect, prior to the scheduled event, data informative of load moving between APs from the plurality of APs, the load moving being responsive to moving one or more trains in accordance with the train schedule; wherein the processor is further configured to process the collected data to obtain data informative of the expected load of the AP during the scheduled event.

16. A non-transitory computer readable medium comprising instructions that, when executed by a computer, cause the computer to perform a method of controlling traffic in a cellular network comprising a plurality of controlled access points (APs) configured to serve passengers, the method comprising:
prior to a scheduled event defined in accordance with a train schedule and associated with an expected substantive increase of passengers to be served by an operation in accordance with a cellular standard AP from the plurality of APs, obtaining, by a computerized system, pre-calculated expected classification results indicative of an expected, during the scheduled event, load of the AP with respect to a downlink and/or uplink load thresholds;
at a scheduled time corresponding to the scheduled event, enabling, by the computerized system, providing one or more pre-configured provisioning actions pre-scheduled in accordance with the pre-calculated expected classification results, wherein the provisioning actions are actions enabling at least one of: changing cell reselection parameters, changing cell footprint parameters and changing cell selection parameters; and
continuously collecting, by the computer system, data informative of the expected load to continuously refine the pre-calculated expected classification results.

* * * * *